(12) United States Patent
Lee et al.

(10) Patent No.: US 11,201,845 B2
(45) Date of Patent: Dec. 14, 2021

(54) ELECTRONIC DEVICE AND METHOD FOR DISPLAYING E-MAIL IN ELECTRONIC DEVICE

(71) Applicant: SAMSUNG ELECTRONICS CO., LTD., Gyeonggi-do (KR)

(72) Inventors: Hyeongmin Lee, Gyeonggi-do (KR); Jeongsik Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/975,926

(22) PCT Filed: Mar. 15, 2019

(86) PCT No.: PCT/KR2019/003014
§ 371 (c)(1),
(2) Date: Aug. 26, 2020

(87) PCT Pub. No.: WO2019/190088
PCT Pub. Date: Oct. 3, 2019

(65) Prior Publication Data
US 2020/0403952 A1 Dec. 24, 2020

(30) Foreign Application Priority Data

Mar. 26, 2018 (KR) .................. 10-2018-0034572

(51) Int. Cl.
*G06F 15/16* (2006.01)
*H04L 12/58* (2006.01)
*G06Q 10/10* (2012.01)

(52) U.S. Cl.
CPC .......... *H04L 51/22* (2013.01); *G06Q 10/107* (2013.01); *H04L 51/046* (2013.01)

(58) Field of Classification Search
USPC ....................................... 709/206
See application file for complete search history.

(56) References Cited

U.S. PATENT DOCUMENTS 7,756,936 B2 * 7/2010 Rosenberg .............. H04L 51/04
709/206
8,577,967 B1 * 11/2013 Chavez ................ G06Q 10/107
709/206

(Continued)

FOREIGN PATENT DOCUMENTS

JP   2010193235    9/2010
JP   2015032092    2/2015

(Continued)

OTHER PUBLICATIONS

PCT/ISA/210 Search Report issued on PCT/KR2019/003014, dated Jun. 17, 2019, pp. 5.

(Continued)

*Primary Examiner* — Anthony Mejia
(74) *Attorney, Agent, or Firm* — The Farrell Law Firm, P.C.

(57) ABSTRACT

According to various embodiments, an electronic device comprises a display, a memory, and a processor, wherein the processor is configured to generate a first file in a chat mail view format, wherein the first file is capable of displaying content of a first email including at least one original message in chat view, and display, through the display, the content of the first email in chat view, based on the first file. Other embodiments are possible.

15 Claims, 14 Drawing Sheets

(56) References Cited

U.S. PATENT DOCUMENTS

| | | | |
|---|---|---|---|
| 9,998,415 B1* | 6/2018 | Meschkat | G06F 3/0481 |
| 2005/0071328 A1 | 3/2005 | Lawrence | |
| 2005/0114781 A1* | 5/2005 | Brownholtz | G06F 3/0482 |
| | | | 715/733 |
| 2006/0053204 A1 | 3/2006 | Sundararajan et al. | |
| 2008/0172391 A1* | 7/2008 | Adelman | G06F 16/958 |
| 2009/0210800 A1 | 8/2009 | McCann et al. | |
| 2010/0124906 A1* | 5/2010 | Hautala | G06Q 10/10 |
| | | | 455/412.1 |
| 2010/0169320 A1 | 7/2010 | Patna et al. | |
| 2010/0312836 A1 | 12/2010 | Serr et al. | |
| 2014/0280460 A1* | 9/2014 | Nemer | G06Q 30/0214 |
| | | | 709/202 |
| 2015/0046542 A1* | 2/2015 | Yamamoto | H04L 12/1822 |
| | | | 709/206 |
| 2015/0188858 A1* | 7/2015 | Nagata | G06F 16/951 |
| | | | 715/758 |
| 2015/0244654 A1* | 8/2015 | Tsubota | G06Q 50/01 |
| | | | 709/206 |
| 2018/0097902 A1* | 4/2018 | Meixner | H04L 51/04 |
| 2018/0260782 A1* | 9/2018 | Bay | H04L 51/36 |

FOREIGN PATENT DOCUMENTS

| | | |
|---|---|---|
| KR | 1020060048951 | 5/2006 |
| KR | 1020070000506 | 1/2007 |
| KR | 1020100138915 | 12/2010 |
| KR | 1020120139294 | 12/2012 |
| KR | 1020130007244 | 1/2013 |

OTHER PUBLICATIONS

PCT/ISA/237 Written Opinion issued on PCT/KR2019/003014, dated Jun. 17, 2019, pp. 11.

* cited by examiner

| | | |
|---|---|---|
| 1301a | Title | RE(3): Reply as to whether you attend (display in RE(N): corresponding to the number of replies) |
| 1301b | Sender | KOO, Senior Research Engineer (* user account) |
| 1301c | Recipient list | KIM, Principal Research Engineer, Hong, Senior Research Engineer, Jung, Research Engineer (recipient list obtained from *chat file) |
| 1301d | Content | Hi. This is Koo. I will be in. |

FIG.13A

| Title | Reply as to whether you attend |
|---|---|
| Sender | KOO, Senior Research Engineer |
| Recipient list | KIM, Principal Research Engineer, Hong, Senior Research Engineer, Jung, Research Engineer |
| Attachments | – |
| Content | Hi. This is Koo. I will be in.  ~1303<br><br>------- Original Message -------<br>Sender : Hong, Senior Research Engineer<br>Date : 11:00<br>Title : Re:Re:Reply as to whether you attend<br><br>I can't attend due to another commitment<br><br>------- Original Message -------<br>Sender : Jung, Research Engineer<br>Date : 10:50<br>Title : Re:Reply as to whether you attend<br><br>Jung will be in.<br><br>------- Original Message -------<br>Sender : KIM, Principal Research Engineer<br>Date : 09:30<br>Title : Reply as to whether you attend<br><br>Please let me know if you can attend on Thursday. |

1304 brackets the three Original Message sections.

FIG.13B

ELECTRONIC DEVICE AND METHOD FOR DISPLAYING E-MAIL IN ELECTRONIC DEVICE

CROSS-REFERENCE TO RELATED APPLICATION(S)

This application is a National Phase Entry of PCT International Application No. PCT/KR2019/003014, which was filed on Mar. 15, 2019 and claims priority to Korean Patent Application No. 10-2018-0034572, which was filed on Mar. 26, 2018, the contents of which are incorporated herein by reference.

BACKGROUND

1. Field

Various embodiments relate to an electronic device that controls to be able to efficiently display receive/send histories of emails on the electronic device and a method of displaying emails on the electronic device.

2. Description of the Related Art

An electronic device may store the received email and display the content of the email by the user's selection.

At least one email received by the electronic device may be displayed in order of time in the inbox or at least one email with the same title may be displayed in bundle.

SUMMARY

In a case where one email is transmitted to a plurality of recipients, if at least one of the plurality of recipients is able to receive a plurality of emails with the same title, the plurality of emails may contain unnecessarily duplicated content (e.g., original message).

For example, if a sender transmits a first email with title A to a plurality of recipients, a first recipient among the plurality of recipients may receive not only the first email with "title A" which is sent from the sender, but also a second email with "Re: title A" from a second recipient of the plurality of recipients and a third email with "ReRe: title A" from a third recipient of the plurality of recipients. In this case, the second email containing one of the original message and the third email containing two of the original message contain unnecessary duplicate content.

According to various embodiments, an electronic device comprises a display, a memory, and a processor configured to generate a first file in a chat mail view format, wherein the first file is capable of displaying content of a first email including at least one original message in chat view and display, through the display, the content of the first email in chat view, based on the first file.

According to various embodiments, a method of displaying an email on an electronic device may comprise generating a first file in a chat mail view format, wherein the first file is capable of displaying content of a first email including at least one original message in chat view and switching into a chat display mode in which the content of the first email is displayed in chat view based on the first file.

According to various embodiments, there may be provided a UI that allows the content of an email containing at least one original message to be viewed conveniently in chat view, and it is possible to receive/send an email that does not include the content of the prior email including the original message but includes only new message content, thereby saving network data.

BRIEF DESCRIPTION OF THE DRAWINGS

FIGS. 6A and 6B are views illustrating a first file and a second file constituting an email on an electronic device according to various embodiments;

FIGS. 10A and 10B are views illustrating the operation of displaying an email in chat view on an electronic device according to various embodiments;

FIGS. 13A and 13B are views illustrating a structure of an email sent while displaying the email in chat view on an electronic device according to various embodiments.

DETAILED DESCRIPTION

Figure 1:
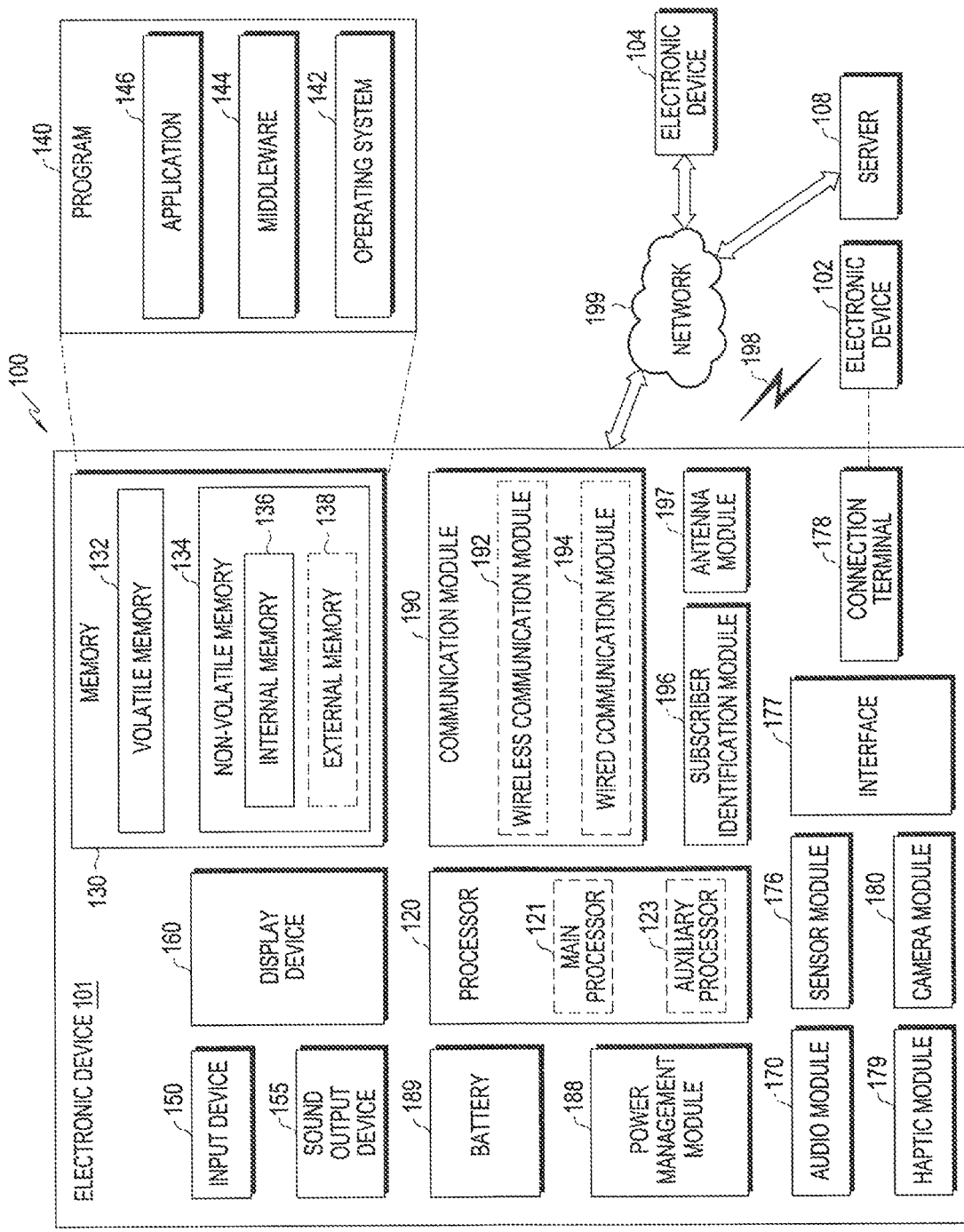
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device (160) (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or sensor module 176) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 1150 may include, e.g., a microphone, a mouse, or a keyboard.

The sound output device 155 may be a device for outputting sound signals to the outside of the electronic device 101. The sound output device 1155 may include, e.g., a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 2660 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) wiredly or wirelessly coupled with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., a HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as Bluetooth, wireless-fidelity (Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a single chip or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., commands or data) therebetween.

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
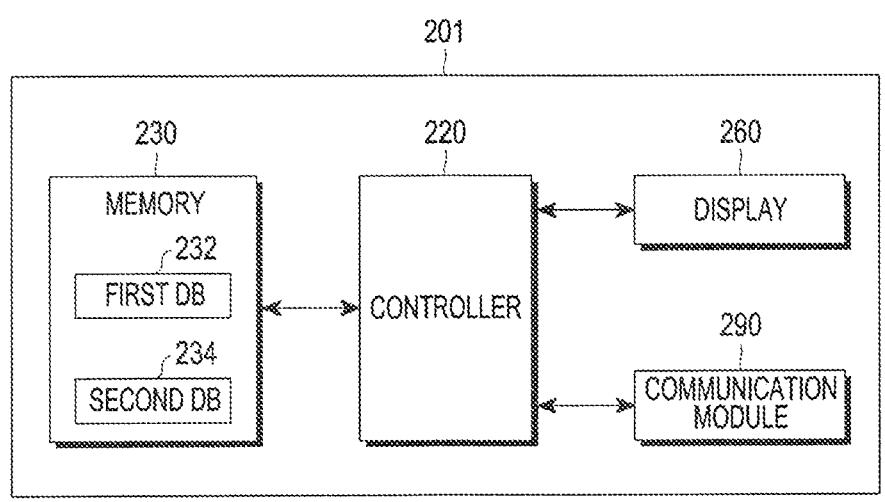
FIG. 2 is a block diagram illustrating an electronic device according to various embodiments.

FIG. 2 is a block diagram of an electronic device 201 (e.g., the electronic device 101, 102, or 104 of FIG. 1) according to various embodiments.

Referring to FIG. 2, an electronic device 201 may include a processor 220, a memory 230, a display 260, and a communication module 290.

The processor 220 may generate a file in a chat mail view format, wherein the filet may display the content of a first email containing at least one original message in chat view and may display in chat view, through the display 260 (e.g., 160 of FIG. 1), the content of the first email containing the at least one original message, based on the first file. For example, original message means the content of an email and may include the prior send history information (sender, time sent, and text generated by the sender) about the email as well as the text generated by the sender of the email. The chat mail view format includes the title, at least two senders according to order of time, and the content of the respective emails of the at least two senders and this is described below in detail with reference to FIG. 7.

According to an embodiment, if chat view is selected on the first email by the user while a plurality of emails are displayed in an email list, the processor 220 may determine whether the first email contains at least one original message and generate a first file ("*.chat") of the first email that may parse at least one original message contained in the content of the first email based on a second file ("*.eml") containing the at least one original message, as it is, in the content of the first email, and display the same in chat view.

According to an embodiment, when chat view is selected on the first email by the user while the plurality of emails are displayed in the email list, if a second email with the same title as the first email in the email list is discovered, the processor 220 may compare the number of original messages contained in the first email with the number of original messages contained in the second email. If the number of original messages contained in the first email is larger than the number of original messages contained in the second email, the processor 220 may generate the first file which allows the content of the first email to be viewed in chat view and, if the number of original messages contained in the second email is larger than the number of original messages contained in the first email, the processor 220 may generate the first file which allows the content of the second email to be viewed in chat view. The processor may generate one first file in the chat mail view format for a plurality of emails (e.g., the first email and the second email) with the same title, designate the same title of the plurality of emails as the file name of the first file, and store it in a first database (hereinafter, DB) 232 of the memory 230 (e.g., 130 of FIG. 1).

According to an embodiment, if tag information indicating that display in chat view is possible is present in the header area of the first email when the first email is received, the processor 220 may generate a first file ("*.chat") of the first email, which may parse at least one original message contained in the content of the first email and display it in chat view. If no tag information indicating that display in chat view is possible is present in the header area of the first email when the first email is received, the processor 220 may determine that at least one original message is not included in the content of the first email and generate a second file ("*.eml") that may display the first email in default email view.

According to an embodiment, if tag information indicating that display in chat view is possible is present in the header area of the first email when the first email is received, the processor 220 may generate a first file ("*.chat") that may view the content of the first email in chat view and a second file ("*.eml") that includes at least one original message, as it is, in the content of the first email.

According to an embodiment, if at least one original message is included in the body area of the first email when the first email is received, the processor 220 may generate a first file ("*.chat") that may parse the at least one original message included in the content of the first email and display it in chat view. If at least one original message is not present in the body area of the first email when the first email is received, the processor 220 may determine that at least one original message is not included in the content of the first email and generate a second file ("*.eml") that may display the first email in a default mail view format. The default mail view format includes the content of the email including the title, recipient, and sender of the email and the original message of the prior email and this is described below in detail with reference to FIG. 5A.

According to an embodiment, if at least one original message is included in the body area of the first email when the first email is received, the processor 220 may generate a first file that may view the content of the first email in chat view and a second file that includes at least one original message, as it is, contained in the content of the first email.

According to an embodiment, the second file (e.g., "*.eml") may be a file that records the history in the email format and, when the content of the email contains at least one original message, includes the at least one original message, as it is, and may be stored in a second DB 234 of the memory 230 (e.g., 130 of FIG. 1). The first file (e.g., "*.chat") may be a file that records the history in the chat mail view format and has completed parsing of at least one original message contained in the content of the email and may be stored in the first DB 232 of the memory 230 (e.g., 130 of FIG. 1).

According to an embodiment, upon storing the first file, which may display the content of the first email in chat view, in the first DB 232 of the memory 230, if the first DB 232 has the first file of the second email with the same title as the first email, the processor 220 may update the first file of the second email based on the first file of the first email without storing the first file of the first email. As the first file stored in the first DB 232 of the memory 230 is stored with the file name which is the same title for the first email and the second email, if chat view is selected for the first email or the second email, display may be performed in chat view based on the first file which has the same title as the file name.

According to an embodiment, if at least one email included in the email list includes the first email with the first file for chat view display when display of email list is selected, the processor 220 may display, through the display 260 (e.g., 160 of FIG. 1), an indicator (e.g., an icon) indicating that display in chat view is possible, near the first item corresponding to the first email while displaying at least one item corresponding to the at least one email in the email list. Upon receiving the second email with the same title as the first email while displaying the indicator near the first item corresponding to the first email in the email list, the processor may remove the indicator, which is displayed near the first item corresponding to the first email through the display 260 (e.g., 160 of FIG. 1) and may display the indicator, which indicates that display in chat view is possible, near a second item corresponding to the second email. The processor may update the first file of the first email stored in the first DB 232 of the memory 230 (e.g., 130 of FIG. 1) based on the first file of the second email with the same title as the first email.

According to an embodiment, the processor 220 may compose text entered using a separate email generate window in the email format, in the chat display mode which displays the content of the first email in chat type based on the first file which may display the content of the first email in chat view and transmit it to at least one recipient displayed in the chat display mode.

According to an embodiment, if do-not-include-original-message transmission is selected after the text is entered using the separate email generate window in the chat display mode which may display the content of the first email in chat view, the processor 220 may transmit an email which includes the generated text in addition to the email data not inclusive of the original message to at least one recipient displayed in the chat display mode.

According to an embodiment, if include-original-message transmission is selected after the text is generated using the separate email generate window in the chat display mode which may display the content of the first email in chat view, the processor 220 may transmit an email which includes the generated text in addition to the email data inclusive of the original message to at least one recipient displayed in the chat display mode. Upon transmitting the email inclusive of the original message, the processor may include tag information, indicating that display in chat view is possible, in the header area of the email.

According to an embodiment, after sending the email to at least one recipient (e.g., three recipients) displayed in the chat display mode, the processor 220 may count the reply emails from the at least one recipient (e.g., three recipients) and display the count near the item corresponding to the latest reply email, thereby indicating that reply emails have been received from all of the at least one recipient (e.g., three recipients).

The memory 230 (e.g., 130 of FIG. 1) may include the first DB 232 and the second DB 234. The first DB 232 may store the first file that may display emails in chat view. The first file (e.g., "*.chat") may be a file that has completed parsing of at least one original message contained in the content of the email and may be stored, with the file name of the email designated as the file name of the first file. The second DB 234 may store the second file that may display emails in default configuration. The second file (e.g., "*.eml") may be a file that contains at least one original message, as it is, in a case where the at least one original message is included in the content of the email.

The display 260 (e.g., 160 of FIG. 1) may display the email containing at least one original message in chat view and may display the email inclusive of at least one original message in the email list distinctively from the other emails.

The electronic device 201 may send emails to another electronic device or receive emails from another electronic device through the communication module 290 (e.g., 190 of FIG. 1).

According to various embodiments, an electronic device comprises a display (e.g., 260 of FIG. 2), a communication module (e.g., 290 of FIG. 2), and a processor (e.g., 220 of FIG. 1) configured to generate a first file in a chat mail view format, wherein the first file is capable of displaying content of a first email including at least one original message in chat view and display, through the display, the content of the first email in chat view, based on the first file.

According to various embodiments, if the first email includes at least one original message when chat view for the first email is selected while an email list is displayed, the processor may be configured to generate the first file which is capable of parsing at least one original message included in the content of the first email from a second file including at least one original message in the content of the first email and displaying the content of the first email in chat view.

According to various embodiments, if a second email including more original messages than original messages included in the first email and having the same title as the first email is discovered from the email list when chat view for the first email is selected, the processor may be configured to generate the first file which is capable of displaying content of the second email in chat view.

According to various embodiments, the processor may be configured to generate the first file which is capable of displaying, in chat view, the content of the first email including at least one original message if tag information indicating that display in chat view is possible is included in a header area of the first email when the first email is received.

According to various embodiments, the processor may be configured to generate the first file which is capable of displaying, in chat view, the content of the first email including at least one original message if at least one original message is included in a body area of the first email when the first email is received.

According to various embodiments, the processor may be configured to update a first file of a second email based on the first file of the first email if a first file of the second email is present with the same title as the first email upon storing the first file of the first email in the memory.

According to various embodiments, the processor may be configured to transmit an email including text to at least one recipient displayed in a chat display mode upon transmitting the text in the email, the text generated in the chat display mode in which the content of the first email is displayed in chat view.

According to various embodiments, the processor may be configured to, when transmitting, as an email, text generated in a chat display mode, in which the content of the first email is displayed in chat view, transmit the email including the generated text added to email data lacking the original message, if the original message is selected as not included.

According to various embodiments, the processor may be configured to, when transmitting, as an email, text generated in a chat display mode, in which the content of the first email is displayed in chat view, transmit the email including the generated text added to email data including the original message, if the original message is selected as included.

According to various embodiments, the processor may be configured to transmit the email including tag information indicating that display in chat view is possible in the header area of the email, upon transmitting the email.

According to various embodiments, the first file in the chat mail view format may include a ".chat" format.

Figure 3:
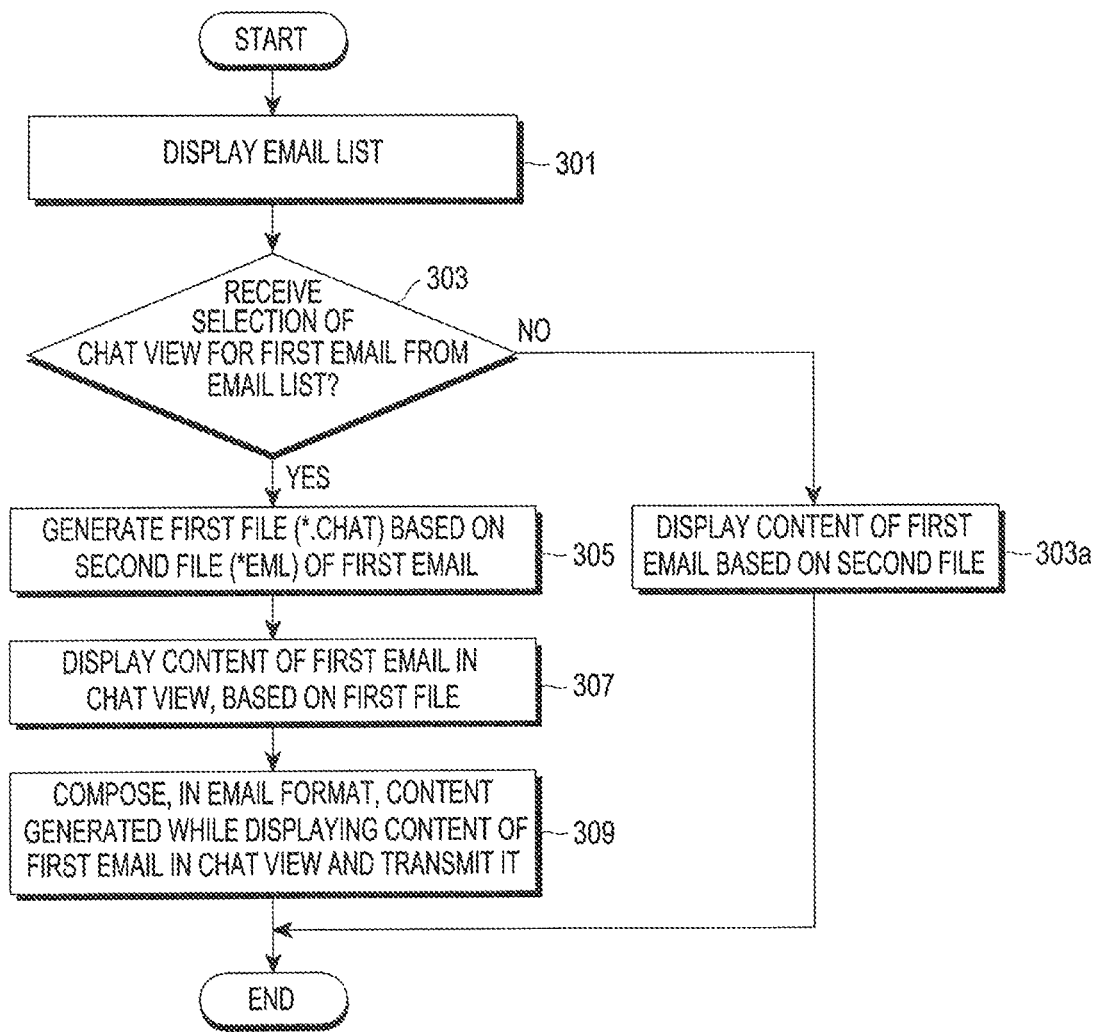
FIG. 3 is a flowchart illustrating a method of displaying an email in chat view on an electronic device according to various embodiments.

FIG. 3 is a flowchart illustrating a method of displaying an email in chat view on an electronic device according to various embodiments.

The email display method may include operations 301 to 309. The email display method may be performed by at least one of an electronic device (e.g., 101 of FIG. 1 or 201 of FIG. 2) or at least one processor (e.g., 120 of FIG. 1 or 210 of FIG. 2) of the electronic device.

In operation 301, the processor may display a plurality of emails in an email list.

In operation 303, the processor may determine whether chat view is selected for a first email and whether the first email contains at least one original message while displaying the plurality of emails in the email list.

Upon determining that chat view is not selected in operation 303, the processor may, in operation 303a, display the content of the first email containing the original message of the prior email through the display 260 (e.g., 160 of FIG. 1) based on the second file ("*.eml") of the first email.

Upon determining that chat view is selected in operation 303, the processor may, in operation 305, generate a first file ("*.chat") that may parse at least one original message contained in the content of the first email based on the second file ("*.eml") including the at least one original message, as it is, in the content of the first email and display it in chat view.

According to an embodiment, upon storing the first file ("*.chat") of the first email in the memory 230 (e.g., 130 of FIG. 1) in the first DB 232 of the memory 230 (e.g., 130 of FIG. 1), the processor may designate the title of the first email as the file name of the first file and store it.

According to an embodiment, if the first file of the second email with the same title as the first email is present in the first DB 232 when the first file ("*.chat") of the first email is stored in the first DB 232 of the memory 230 (e.g., 130 of FIG. 1), the processor may update the first file of the second email based on the first file of the first email and store it.

In operation 307, the processor may display the content of the first email, through the display 260 (e.g., 160 of FIG. 1), in chat view based on the first file ("*.chat") of the first email.

According to an embodiment, in a case where the first DB 232 of the memory 230 (e.g., 130 of FIG. 1) has the first file of the second email with the same title as the first email so that the first file of the second email is updated based on the first file of the first email without storing the first file of the first email, the processor may display, through the display 260 (e.g., 160 of FIG. 1), the content of the second email in chat view, based on the second file of the second email.

In operation 309, the processor may compose the text generated by the user in the chat display mode, which displays the content of the first email in chat view through the display 260 (e.g., 160 of FIG. 1), in the email format and transmit it to at least one recipient displayed in the chat display mode.

Figure 4:
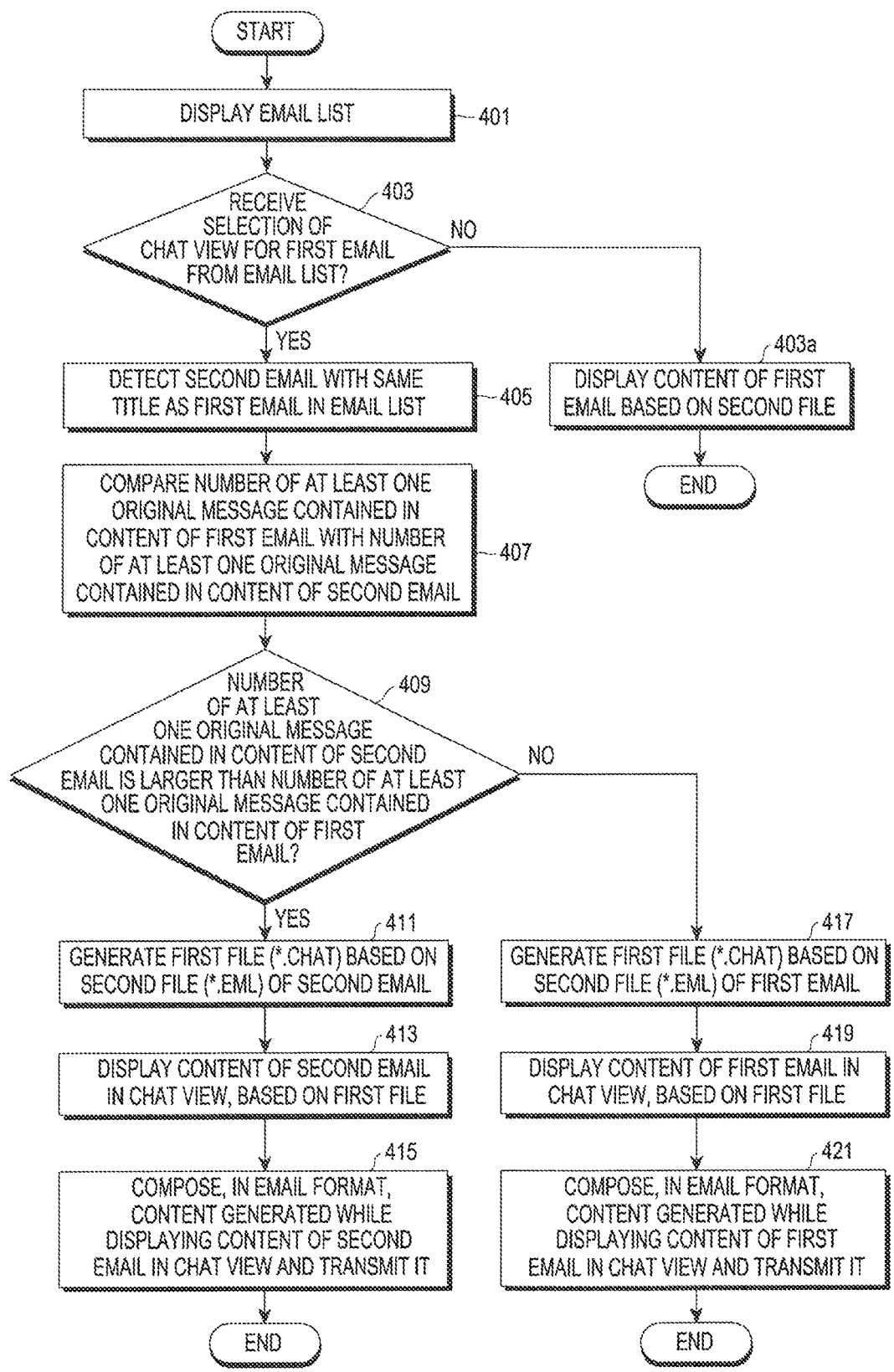
FIG. 4 is a flowchart illustrating a method of displaying an email in chat view depending on the number of original messages included in the email on an electronic device according to various embodiments.

FIG. 4 is a flowchart illustrating a method of displaying an email in chat view depending on the number of original messages included in the email on an electronic device according to various embodiments.

The email display method may include operations 401 to 421. The email display method may be performed by at least one of an electronic device (e.g., 101 of FIG. 1 or 201 of FIG. 2) or at least one processor (e.g., 120 of FIG. 1 or 210 of FIG. 2) of the electronic device.

In operation 401, the processor may display a plurality of emails in an email list.

In operation 403, the processor may determine whether chat view is selected for a first email and whether the first email contains at least one original message while displaying the plurality of emails in the email list.

Upon determining that chat view is not selected in operation 403, the processor may, in operation 403a, display the content of the first email containing the original message of the prior email through the display 260 (e.g., 160 of FIG. 1) based on the second file ("*.eml") of the first email.

Upon determining that chat view is selected in operation 403, the processor may, in operation 405, detect the second email with the same title as the first email among the plurality of emails included in the email list.

In operation 407, the processor may compare the number of at least one original message contained in the content of the first email with the number of at least one original message contained in the content of the second email.

If the number of at least one original message contained in the content of the second email is larger than the number of at least one original message contained in the content of the first email in operation 409, the processor may, in operation 411, generate a first file ("*.chat") that may parse at least one original message contained in the content of the second email based on the second file ("*.eml") including at least one original message, as it is, in the content of the second email and display it in chat view.

In operation 413, the processor may display the content of the second email, through the display 260 (e.g., 160 of FIG. 1), in chat view based on the first file ("*.chat") of the second email.

In operation 415, the processor may compose the text generated by the user in the chat display mode, which displays the content of the second email in chat view through the display 260 (e.g., 160 of FIG. 1), in the email format and transmit it to at least one recipient displayed in the chat display mode.

If the number of at least one original message contained in the content of the first email is larger than the number of at least one original message contained in the content of the second email in operation 409, the processor may, in operation 417, generate a first file ("*.chat") that may parse at least one original message contained in the content of the first email based on the second file ("*.eml") including at least one original message, as it is, in the content of the first email and display it in chat view.

In operation 419, the processor may display the content of the first email, through the display 260 (e.g., 160 of FIG. 1), in chat view based on the first file ("*.chat") of the first email.

In operation 421, the processor may compose the text generated by the user in the chat display mode, which displays the content of the first email in chat view through the display 260 (e.g., 160 of FIG. 1), in the email format and transmit it to at least one recipient displayed in the chat display mode.

Figures 6A, 6B:
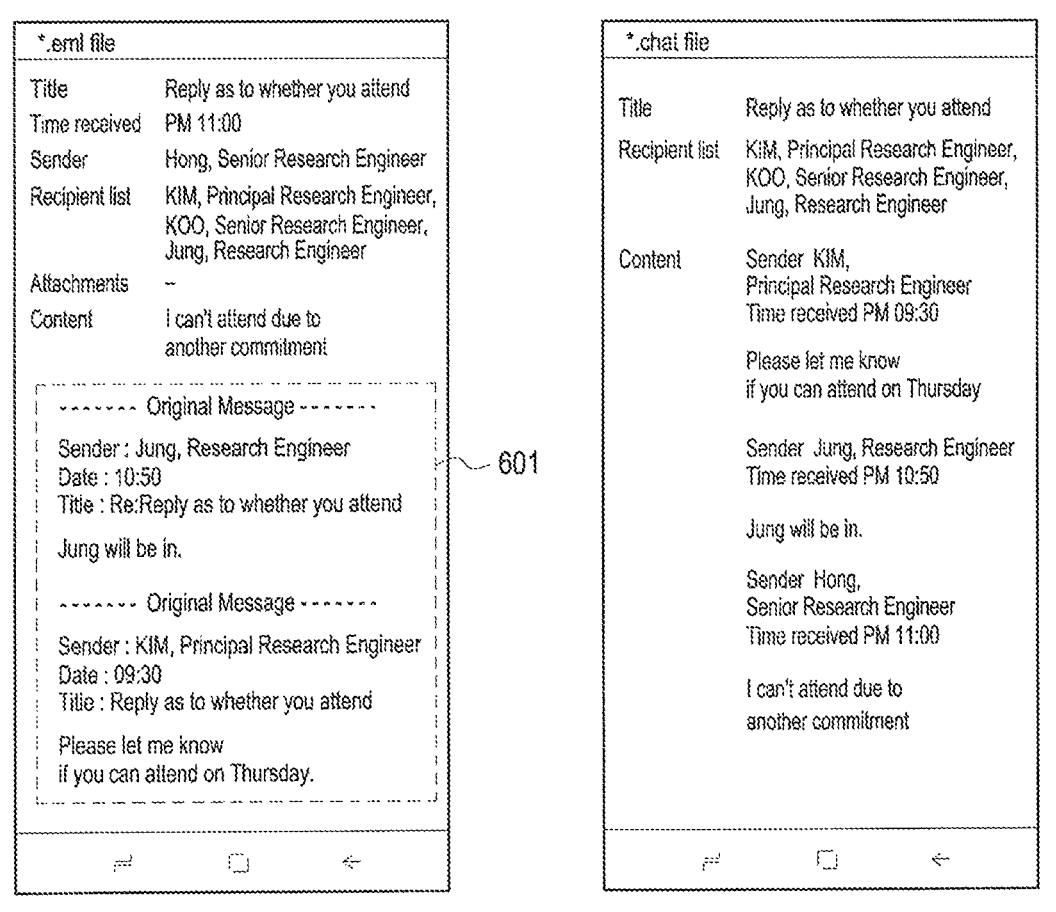
Figure 7:
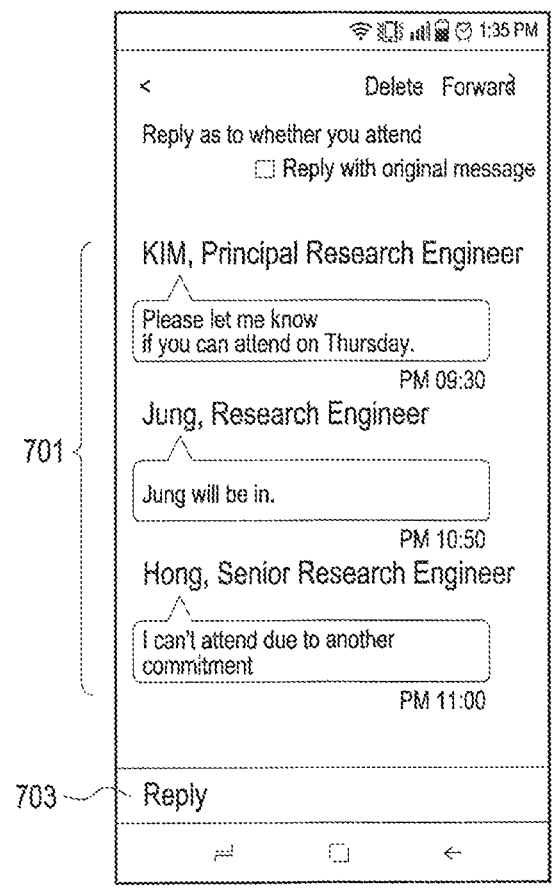
FIG. 7 is a view illustrating a user interface for email chat view on an electronic device according to various embodiments.

FIGS. 5A to 5D are views illustrating a method of generating an email chat view on an electronic device according to various embodiments. FIGS. 6A and 6B are views illustrating a first file and a second file constituting an email on an electronic device according to various embodiments. FIG. 7 is a view illustrating a user interface for email chat view on an electronic device according to various embodiments.

Figure 5A:
FIGS. 5A to 5D are views illustrating a method of generating an email chat view on an electronic device according to various embodiments.
Figure 5B:
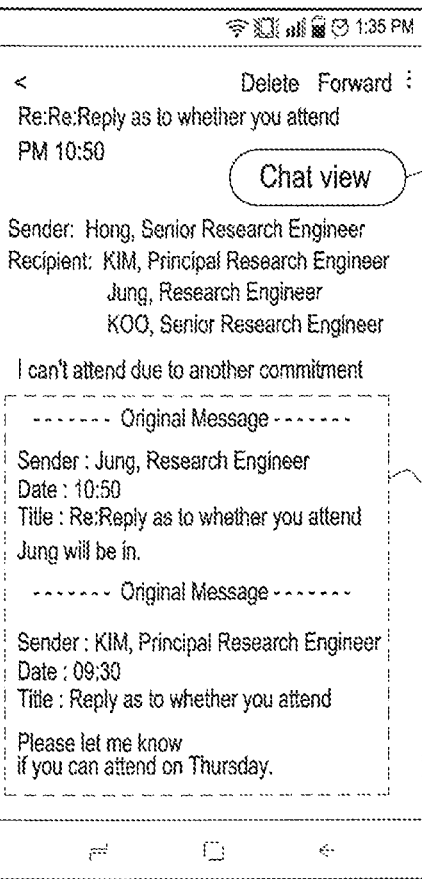

If a first email 501 is selected while an email list including a plurality of emails is displayed in the inbox as shown in FIG. 5A, the processor (e.g., 120 of FIG. 1 or 220 of FIG. 2) may display, in default mail view format, the first email based on the second file ("*.eml") of the first email 501 as shown in FIG. 5B. The default mail view format may display the email content including the title, recipient, and sender of the first email 501 and the original message of the prior email. FIG. 6A illustrates data constituting the second file ("*.eml") of the first email 501. The content of the first email includes two original messages 601 as they are. Based on the second file of the first email as shown in FIG. 6A, the processor may display two original messages 503, as they are, from which the send history for the first email may be known, in addition to the text generated by the sender in the content of the first email as shown in FIG. 5B.

Figure 5C:
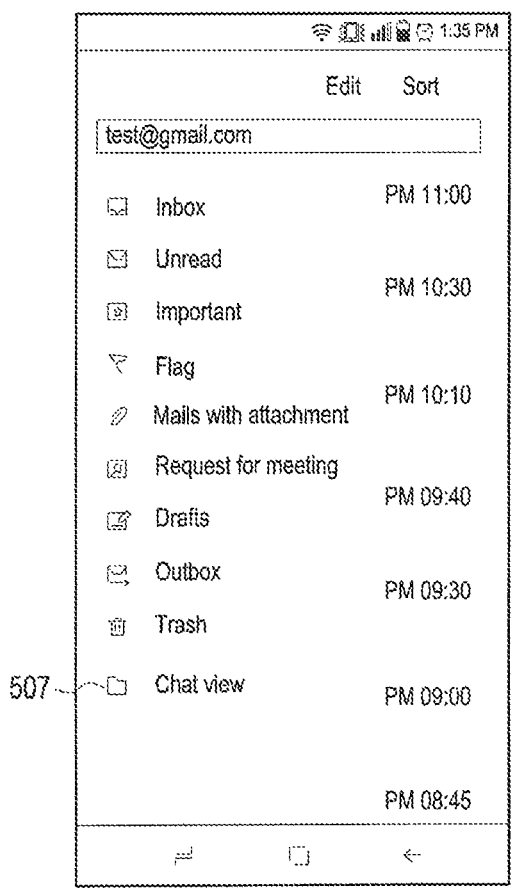

If chat view 505 which is a chat view selection menu icon for the first email 501 is selected in FIG. 5B, the processor may move or copy the first email 501 to the chat view folder 507 of FIG. 5C. If the first email 501 is moved or copied to the chat view folder 507, the processor may generate a first file ("*.chat") for parsing the two original messages included in the first email based on the second file ("*.eml") of the first email and displaying it in chat view. FIG. 6B illustrates data constituting the first file ("*.chat") of the first email 401, which may be a file obtained by parsing two original messages included in the first email and configuring the three senders of the first email and the text sent from each of the three senders in order of time so as to display the content of the first email in chat view. If the chat view folder 507 is selected in FIG. 5C, in FIG. 5D, the processor may display the first email generated based on the first file of the first email included in the chat view folder 507, as, e.g., reply-as-to-whether-you-attend email 509.

Figure 5D:
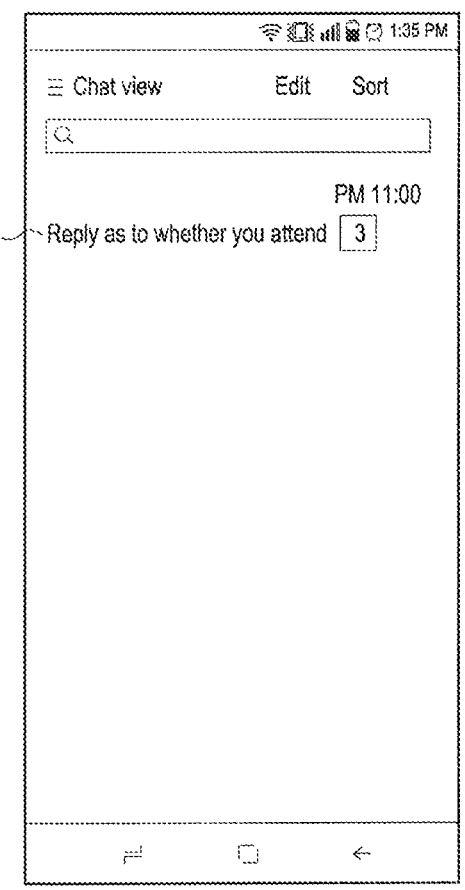

If the first email 509 is selected in the chat view folder in FIG. 5D, the processor may display the first email in the chat mail view format as shown in FIG. 7, based on the first file of the first email. The chat mail view format may display the title and at least two senders and the content of the email of each of the at least two senders according to order of time. If the first email is displayed in chat view according to the chat mail view format as shown in FIG. 7, the processor may display the three senders 701 and the text generated by each of the three senders at the left of the screen of the display 260 (160 of FIG. 1) according to order of time and may display a separate generate window 703 for replying to the three senders at the bottom of the screen of the display 260 (160 of FIG. 1).

Figure 8:
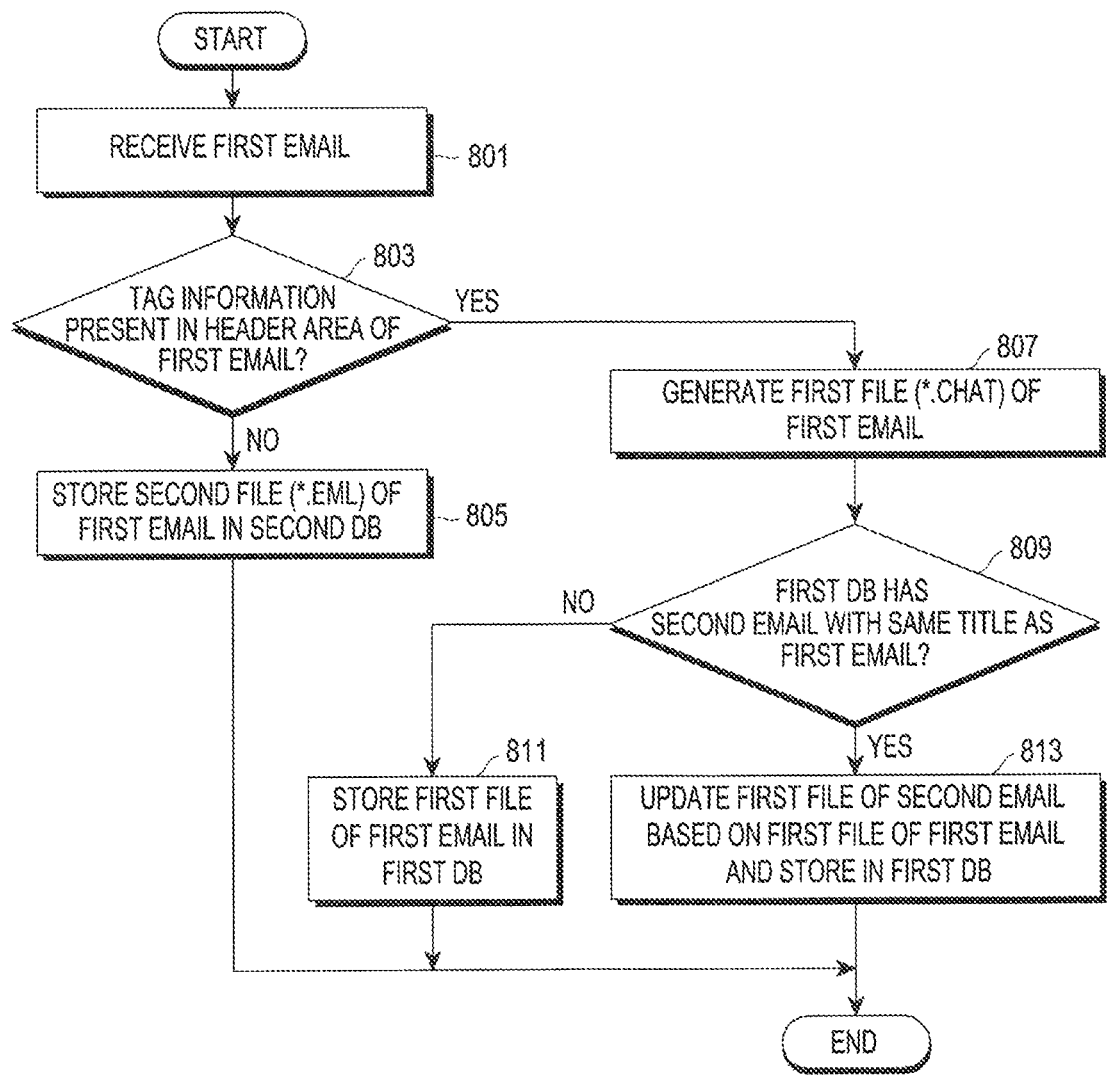
FIG. 8 is a flowchart illustrating a method of displaying an email on an electronic device according to various embodiments.

FIG. 8 is a flowchart illustrating a method of displaying an email on an electronic device according to various embodiments. The email display method may include operations 801 to 813. The email display method may be performed by at least one of an electronic device (e.g., 101 of FIG. 1 or 201 of FIG. 2) or at least one processor (e.g., 120 of FIG. 1 or 210 of FIG. 2) of the electronic device.

In operation 801, the processor may receive a first email through the communication module 290 (e.g., 190 of FIG. 1).

In operation 803, the processor may detect the presence or absence of tag information indicating that display in chat view is possible in the header area of the first email.

In operation 803, if no tag information indicating that display in chat view is possible is present in the header area of the first email, the processor may determine that at least one original message is not included in the content of the first email and, in operation 805, generate a second file ("*.eml") that may record the history of the first email in the email format and store it in the second DB 234 of the memory 230.

In operation 803, if tag information indicating that display in chat view is possible is present in the header area of the first email, the processor may generate a first file ("*.chat"), which may parse at least one original message contained in the content of the first email and display it in chat view.

According to an embodiment, if tag information indicating that display in chat view is possible is present in the header area of the first email, the processor may generate both the first file ("*.chat") of the first email and the second file ("*.eml") that includes at least one original message included in the content of the first email.

In operation 809, upon storing the first file ("*.chat") of the first email in the first DB 232 of the memory 230, the processor may determine whether the second email with the same title as the first email is present in the first DB 232.

If the second email with the same title as the first email is not present in the first DB 232 in operation 809, the processor may designate the file name of the first file of the first email as the title of the first email and store it in the first DB 232 in operation 811.

If the second email with the same title as the first email is present in the first DB 232 in operation 809, the processor may update the first file of the second email based on the first file of the first email and store it in the first DB 232 in operation 813.

According to various embodiments, the processor may check whether at least one original message is included in the body area of the received first email and, if the at least one original message is not included in the body area, perform operation 805. If at least one original message is included in the body area, the processor may perform operations 807 to 811.

Figure 9:
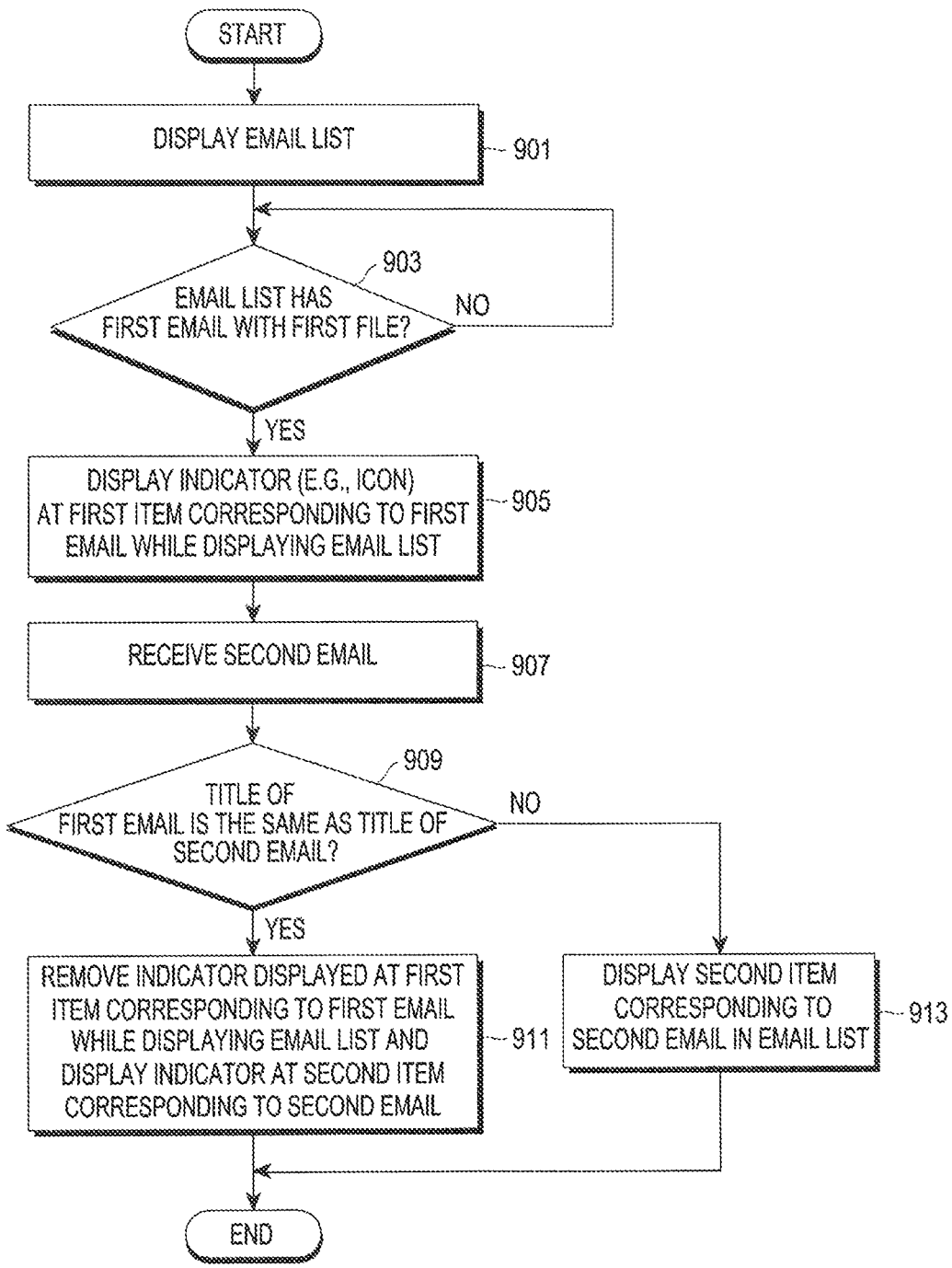
FIG. 9 is a flowchart illustrating a method of displaying an email in chat view on an electronic device according to various embodiments.

FIG. 9 is a flowchart illustrating a method of displaying an email in chat view on an electronic device according to various embodiments.

The email display method may include operations 901 to 913. The email display method may be performed by at least one of an electronic device (e.g., 101 of FIG. 1 or 201 of FIG. 2) or at least one processor (e.g., 120 of FIG. 1 or 210 of FIG. 2) of the electronic device.

In operation 901, the processor may display a plurality of emails in an email list.

In operation 903, the processor may determine whether a first email with a first file which enables display in chat view is included in the plurality of emails included in the email list. If the first email with the first file which enables display in chat view is included in the plurality of emails included in the email list in operation 903, the processor may display an indicator (e.g., an icon) for indicating that display in chat view is possible near a first item corresponding to the first email while displaying the email list in operation 905.

In operation 907, the processor may receive a second email through the communication module 290 (e.g., 190 of FIG. 1) while displaying the indicator (e.g., an icon) for indicating that display in chat view is possible, near the first item corresponding to the first email in the email list.

In operation 909, the processor may determine whether the title of the first email is identical to the title of the second email.

Upon determining that the title of the first email is identical to the title of the second email in operation 909, the processor may, in operation 911, remove the indicator (e.g., an icon) for indicating that display in chat view is possible, displayed near the first item corresponding to the first email in the email list, add a second item corresponding to the second email, and display an indicator (e.g., an icon), which indicates that display in chat view is possible, near the second item.

If the title of the first email is determined to be different from the title of the second email in operation 909, the processor may add the second item corresponding to the second email to the email list and display the same in operation 913.

Figures 10A, 10B:
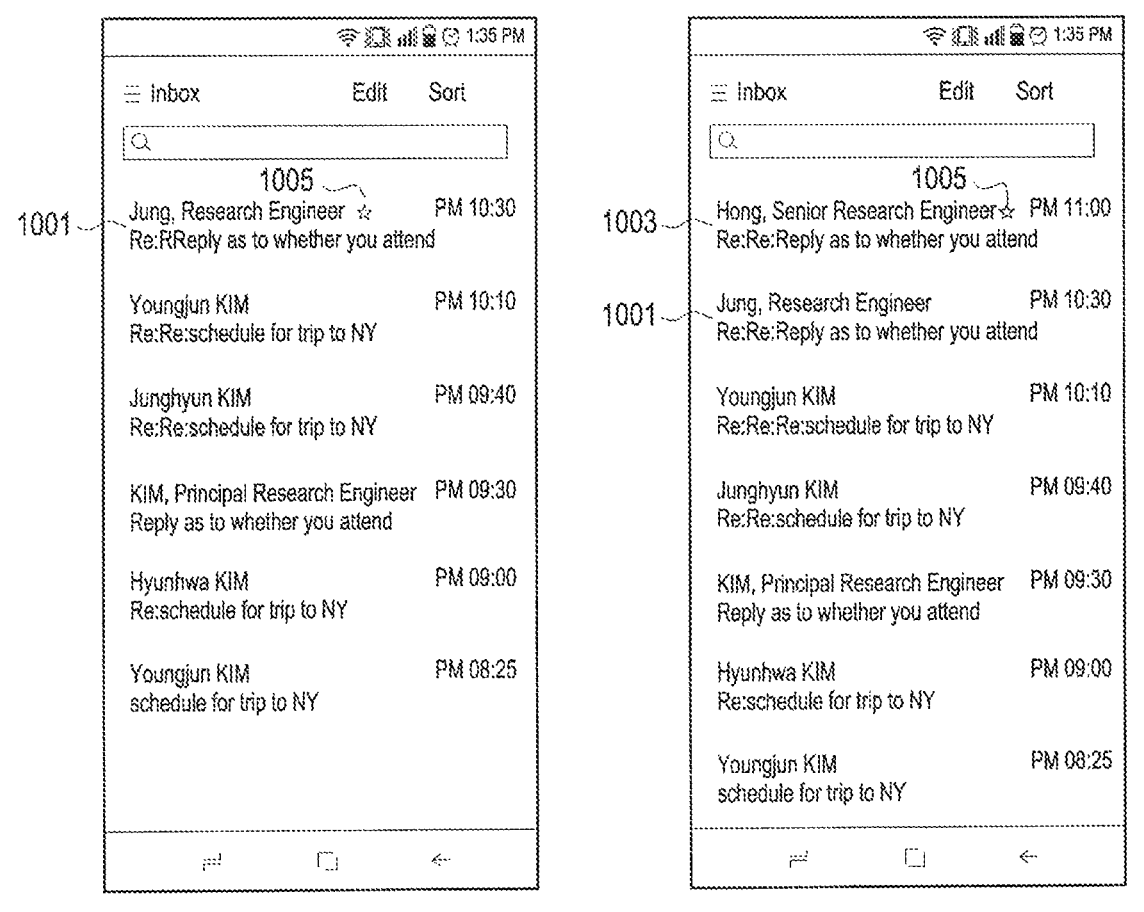

FIGS. 10A and 10B are views illustrating the operation of displaying an email in chat view on an electronic device according to various embodiments.

Referring to FIG. 10A, a processor (e.g., 120 of FIG. 1 or 220 of FIG. 2) may display an indicator 1005, which indicates that display in chat view is possible, near a first item 1001 corresponding to a first email with a first file ("*.chat") for display in chat view while displaying an email list. Thereafter, upon receiving a second email with the same title as the first email, the processor may remove the indicator 1005, which has been displayed near the first item 1001 corresponding to the first email and display an indicator 1005 for indicating that display in chat view is possible, near a second item 1003 corresponding to the second email.

Figure 11:
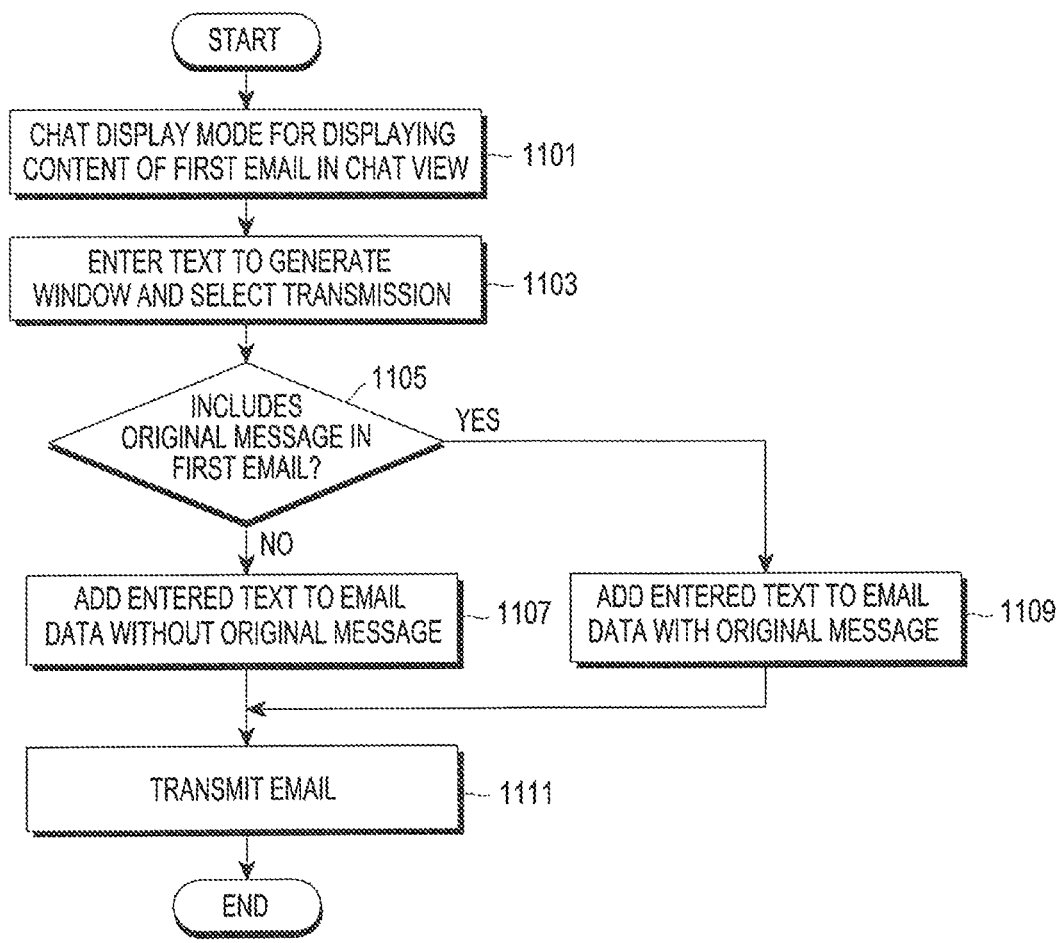
FIG. 11 is a flowchart illustrating a method of sending an email on an electronic device according to various embodiments.

FIG. 11 is a flowchart illustrating a method of sending an email on an electronic device according to various embodiments. The email display method may include operations 1101 to 1111. The email display method may be performed by at least one of an electronic device (e.g., 101 of FIG. 1 or 201 of FIG. 2) or at least one processor (e.g., 120 of FIG. 1 or 210 of FIG. 2) of the electronic device.

In operation 1101, the processor may switch to a chat display mode to display the content of the first email in chat view based on the first file ("*.chat") for display in chat view. The processor may display at least one sender, who has sent the first email, and the text generated by the sender according to order of time in the chat display mode and display a separate generate window for generating text for replying to the at least one sender.

In operation 1103, text may be entered to the separate generate window, and the processor may receive a selection of transmission to reply to the at least one sender with the entered text.

In operation 1105, upon receiving a selection of transmission for replying to at least one sender with the text entered to the separate generate window, the processor may determine whether to include the at least one original message included in the first email.

Unless the at least one original message included in the first email is selected as included in operation 1105, the processor may add the entered text to the email data, which lacks the at least one original message, in operation 1107.

If the at least one original message included in the first email is selected as included in operation 1105, the processor may add the entered text to the email data, which includes the at least one original message, in operation 1109.

In operation 1111, the processor may reply to the at least one sender displayed in the chat display mode, with the email which lacks the original message and adds the entered text as in operation 1107 or the email which includes the original message and adds the entered text as in operation 1109.

Figure 12:
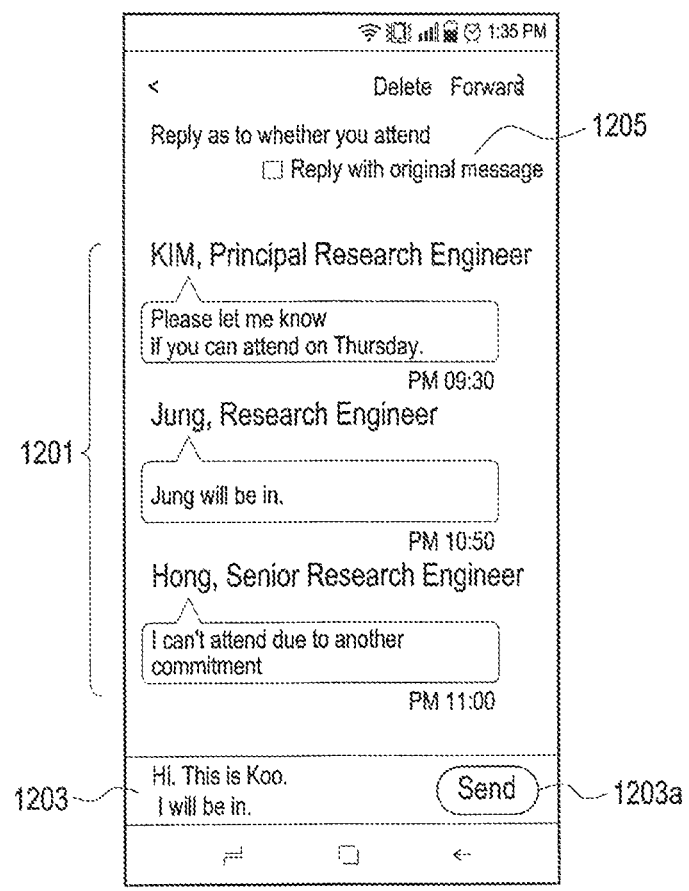
FIG. 12 is a view illustrating the operation of sending an email while displaying the email in chat view on an electronic device according to various embodiments.

FIG. 12 is a view illustrating the operation of sending an email while displaying the email in chat view on an electronic device according to various embodiments. FIGS. 13A and 13B are views illustrating a structure of an email sent while displaying the email in chat view on an electronic device according to various embodiments.

As shown in FIG. 12, a processor (e.g., 120 of FIG. 1 or 220 of FIG. 2) may display the first email in chat view, in the chat display mode. The processor may display three senders 1201, who have sent the first email, and the text generated by each of the three senders at the left of the screen in the chat display mode and a separate generate window 1203 for entering text for reply to the three senders at the bottom. If the send button 1203a is selected with reply with original message 1205 not selected after text has been entered to the separate generate window 1203, the processor may send an email, which lacks the three original messages corresponding to the three senders and includes only the text entered to the separate generate window 1203, to the three senders included in the recipient list as shown in FIG. 13A.

As shown in FIG. 13A, the title field 1301a may include the reply count ("RE(3)"), which is represented by RE(N) indicating the number of replies, and the title ("Reply as to whether you attend"), the sender filed 1301b may include sender information ("Koo, Senior Research Engineer") corresponding to the user account, the recipient list field 1301c may include the receive list obtained from the first file (e.g., that of FIG. 6B) of the first email, and the body field 1301d may include the text entered by the sender through the separate generate window 1203.

If the send button 1203a is selected with reply with original message 1205 selected after text has been entered to the separate generate window 1203, the processor may send an email, which includes the three original messages 1304 corresponding to the three senders and includes the text 1303 entered to the separate generate window 1203, to the three senders included in the recipient list as shown in FIG. 13B.

According to various embodiments, a method of displaying an email on an electronic device may comprise generating a first file in a chat mail view format, wherein the first file is capable of displaying content of a first email including at least one original message in chat view and switching into a chat display mode in which the content of the first email is displayed in chat view based on the first file.

According to various embodiments, generating the first file may include determining whether at least one original message is included in the first email when chat view for the first email is selected while an email list is displayed, and if at least one original message is included in the first email, generating the first file which is capable of parsing at least one original message included in the content of the first email from a second file including at least one original message in the content of the first email and displaying the content of the first email in chat view.

According to various embodiments, the method may further comprise, if a second email including more original messages than original messages included in the first email and having the same title as the first email is discovered from the email list when chat view for the first email is selected, generating the first file which is capable of displaying content of the second email in chat view.

According to various embodiments, generating the first file may include generating the first file which is capable of displaying, in chat view, the content of the first email including at least one original message if tag information indicating that display in chat view is possible is included in a header area of the first email when the first email is received.

According to various embodiments, generating the first file may include generating the first file which is capable of displaying, in chat view, the content of the first email including at least one original message if at least one original message is included in a body area of the first email when the first email is received.

According to various embodiments, the method may further comprise updating a first file of a second email based on the first file of the first email if a first file of the second email is present with the same title as the first email upon storing the first file of the first email.

According to various embodiments, the method may further comprise, when transmitting an email including text generated in the chat display mode, transmitting the email including the generated text to at least one recipient displayed in a chat display mode.

According to various embodiments, the method may further comprise, when transmitting an email, including text generated in the chat display mode added email data lacking the original message, if the original message is selected as not included upon sending the text in the email.

According to various embodiments, the method may further comprise, if the original message is selected as included upon sending text generated in the chat display mode in an email, transmitting the email including the generated text added email data including the original message.

According to various embodiments, the method may further comprise transmitting the email including tag information indicating that display in chat view is possible in the header area of the email, upon transmitting the email.

According to various embodiments, the first file in the chat mail view format may include a ".chat" format.

As used herein, the term "module" includes a unit configured in hardware, software, or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations. According to an embodiment of the present invention, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., CD-ROM, DVD, magnetic-optical medium (e.g., floptical disk), or an embedded memory. The instruction may include a code created by a compiler or a code executable by an interpreter.

According to various embodiments, there is provided a storage medium storing instructions configured to be executed by at least one processor to enable the processor to perform at least one operation that may include displaying an email on an electronic device may comprise generating a first file in a chat mail view format, wherein the first file is capable of displaying content of a first email including at least one original message in chat view, and switching into a chat display mode in which the content of the first email is displayed in chat view based on the first file.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

The invention claimed is:

1. An electronic device, comprising:
   a display;
   a memory; and
   a processor configured to
   based on selection to display content of a first email in a chat view, parse at least one original message included in the content of the first email to generate a first file, and
   display, through the display, the content of the first email in the chat view, based on the first file.

2. The electronic device of claim 1, wherein the processor is further configured to, if the first email includes at least one original message when selecting for displaying the content of the first email in the chat view is identified while an email list is displayed, parse at least one original message included in the content of the first email from a second file including at least one original message in the content of the first email to generate the first email.

3. The electronic device of claim 2, wherein the processor is further configured to, if a second email including more original messages than original messages included in the first email and having the same title as the first email is discovered from the email list when selecting for displaying the content of the first email in the chat view is identified, parse at least one original message included in content of the second email to generate the first file.

4. The electronic device of claim 1, wherein the processor is further configured to generate the first file for displaying, in chat view, the content of the first email including at least one original message, if tag information indicating that display in chat view is possible is included in a header area of the first email or at least one original message is included in a body area of the first email when the first email is received.

5. The electronic device of claim 1, wherein the processor is further configured to update a first file of a second email based on the first file of the first email, if a first file of the second email is present with the same title as the first email upon storing the first file of the first email in the memory.

6. The electronic device of claim 1, wherein the processor is further configured to transmit an email including text to at least one recipient displayed in a chat display mode, upon transmitting the text in the email, the text generated in the chat display mode in which the content of the first email is displayed in chat view.

7. The electronic device of claim 1, wherein the processor is further configured to:
when transmitting, as an email, text generated in a chat display mode, in which the content of the first email is displayed in chat view, transmit the email including the generated text added to email data lacking the original message, if the original message is selected as not included.

8. The electronic device of claim 1, wherein the processor is further configured to:
when transmitting, as an email, including text generated in a chat display mode, in which the content of the first email is displayed in chat view, transmit the email including the generated text added to email data including the original message, and include tag information indicating that display in chat view is possible in a header area of the email, if the original message is selected as included.

9. A method of displaying an email on an electronic device, the method comprising:
based on selection to display content of a first email in a chat view, parsing at least one original message included in the content of the first email to generate a first file; and
switching into a chat display mode in which the content of the first email is displayed in the chat view based on the first file.

10. The method of claim 9, wherein parsing the at least one original message includes:
determining whether at least one original message is included in the first email when selecting for displaying the content of the first email in the chat view is identified while an email list is displayed; and
if at least one original message is included in the first email, parsing at least one original message included in the content of the first email from a second file including at least one original message in the content of the first email to generate the first file.

11. The method of claim 10, further comprising, if a second email including more original messages than original messages included in the first email and having the same title as the first email is discovered from the email list when selecting for displaying the content of the first email in the chat view is identified, parsing at least one original message included in content of the second email to generate the first file.

12. The method of claim 9, wherein parsing the at least one original message includes generating the first file for displaying, in chat view, the content of the first email including at least one original message, if tag information indicating that display in chat view is possible is included in a header area of the first email or at least one original message is included in a body area of the first email when the first email is received.

13. The method of claim 9, further comprising updating a first file of a second email based on the first file of the first email if a first file of the second email is present with the same title as the first email upon storing the first file of the first email.

14. The method of claim 9, further comprising, when transmitting an email including text generated in the chat display mode, transmitting the email including the generated text to at least one recipient displayed in the chat display mode.

15. The method of claim 9, further comprising:
if the original message is selected as included upon when transmitting text generated in the chat display mode in an email, transmitting the email including the generated text added to email data including the original message; and
transmitting the email including tag information indicating that display in chat view is possible in a header area of the email.

* * * * *